United States Patent [19]

Brudnoy

[11] Patent Number: 4,637,717
[45] Date of Patent: Jan. 20, 1987

[54] DUAL BEAM TRANSLATOR FOR USE IN LASER DOPPLER ANEMOMETRY

[75] Inventor: David M. Brudnoy, Albany, N.Y.

[73] Assignee: The United States of America as represented by the United States Department of Energy, Washington, D.C.

[21] Appl. No.: 599,291

[22] Filed: Apr. 12, 1984

[51] Int. Cl.$^4$ .......................... G01P 3/36; G02B 26/08
[52] U.S. Cl. .................................. 356/28.5; 350/484; 350/169; 356/28
[58] Field of Search .................. 350/484, 169; 356/28, 356/28.5

[56] References Cited

U.S. PATENT DOCUMENTS

| | | | |
|---|---|---|---|
| 2,145,437 | 1/1939 | Thomas | 350/169 |
| 2,669,900 | 2/1954 | Cherry | 350/169 |
| 3,137,756 | 6/1964 | Gunther et al. | 356/381 |
| 3,547,526 | 12/1970 | Devereux . | |
| 3,860,342 | 1/1975 | Orloff et al. | 356/28.5 |
| 4,167,329 | 9/1979 | Jelalian et al. | 356/28.5 |
| 4,176,950 | 12/1979 | Franke | 356/28 |
| 4,346,990 | 8/1982 | Rhodes | 356/28.5 |

OTHER PUBLICATIONS

R. J. Goldstein et al, "Physics of Fluids", vol. 10, p. 1349, 1967.
Southall; "Mirrors, Prisms and Lenses", 3rd ed., p. 699, 1945.
Hoesel et al, "Review of Scientific Instruments", vol. 48, No. 7, p. 910, Jul. 1977.
Yeh et al, "Applied Physics Letters", vol. 4, No. 10, p. 176, May 1964.

*Primary Examiner*—Stephen C. Buczinski
*Attorney, Agent, or Firm*—Judson R. Hightower; Richard E. Constant

[57] ABSTRACT

A method and apparatus for selectively translating the path of at least one pair of light beams in a Laser Doppler anemometry device whereby the light paths are translated in a direction parallel to the original beam paths so as to enable attainment of spacial coincidence of the two intersection volumes and permit accurate measurements of Reynolds shear stress.

30 Claims, 9 Drawing Figures

| INTERSECTION VOLUME OF VERTICAL BEAMS | INTERSECTION VOLUME OF HORIZONTAL BEAMS |
|---|---|
|  |  |

COINCIDENT INTERSECTION VOLUMES

DUAL BEAM TRANSLATOR FOR USE IN LASER DOPPLER ANEMOMETRY

BACKGROUND AND FIELD OF THE INVENTION

The present invention is directed to a method and apparatus for use in Laser Doppler anemometry for obtaining substantial spacial coincidence of the intersection volumes of two pairs of intersecting laser beams in a fluid flow conduit to provide a better means for measuring characteristics important in studying fluid flow properties.

Studies on the properties of fluid flow mechanics including the development of turbulent flow models generally require an accurate determination of the Reynolds shear stress for a variety of flow geometries. The Reynolds stress elements are obtained from simultaneous measurement of two components of the flow velocity at the same point in space. For example, one element of the Reynolds shear stress is $\tau = -\rho <\Delta u \Delta v>$, wherein $\rho$ is the fluid density, $\Delta u$ and $\Delta v$ are the fluctuating parts of the two velocity components u and v respectively and $<>$ means a time or ensemble average. The Reynolds stress is then determined and defined at a point in space within the fluid flow region.

Recently, Laser Doppler anemometry (LDA) has been developed as a method for measuring fluid velocity non-invasively. The LDA method requires that a pair of thin coherent light beams (laser beams) of the same frequency intersect within the traveling fluid of a conduit as shown in FIG. 1. Direct measurement of the Reynolds shear stress by the LDA method requires simultaneous measurements with two pairs of beams that intersect at the same spacial location within the fluid flow conduit. That is, it is necessary that the two intersection volumes of the two pairs of beams attain a spacial coincidence within the fluid flow conduit. Thus a two-channel or two-color LDA system is utilized to measure correlations between mutually perpendicular components of the fluid velocity.

However, in cylindrical conduits this spacial coincidence rarely occurs due to severe refraction effects at the cylindrical interfaces. This problem in obtaining spacial coincidence is not as great for rectangular fluid conduits because spacial coincidence of two pairs of intersecting beams can effectively occur anywhere within the conduit. But in the cylindrical type of conduits, such spacial coincidence is difficult to attain and rarely occurs.

OBJECTS AND SUMMARY OF THE INVENTION

It is therefore one object of the present invention to provide a method for attaining spacial coincidence of the intersection volumes of two pairs of intersecting laser beams in a fluid flow conduit in a Laser Doppler anemometry device.

It is another object of the present invention to provide an apparatus for attaining spacial coincidence of the intersection volumes of two pairs of light beams in a Laser Doppler anemometry device.

It is a further object of the present invention to provide an apparatus including a pair of rotatable transparent optical means located between a beam focusing lens and a fluid flow conduit whereby the beam path of one pair of intersecting light beams can be selectively translated in a direction parallel to the original beam paths so as to obtain spacial coincidence of the intersection volumes of two pairs of intersecting beams.

It is another object of the present invention to provide such a device for translating the direction of the light beams wherein the optical means is comprised of a pair of glass plates positioned between a focusing lens and the fluid flow conduit.

It is still a further object of the present invention to provide a dual beam translator for use in a Laser Doppler anemometry device for attaining spacial coincidence of two pairs of intersecting laser beams in a fluid flow conduit by utilizing a pair of optical scanners for precise and selective rotation of associated glass plates in the path of one pair of light beams between a final focusing lens and the fluid flow conduit.

These and further objects of the present invention are accomplished by a method and apparatus for selectively translating the path of at least one pair of light beams in a Laser Doppler anemometry device whereby the light paths are translated in a direction parallel to the original beam paths so as to enable attainment of spacial coincidence of the two intersection volumes.

DETAILED DESCRIPTION OF THE INVENTION

Figure 1:
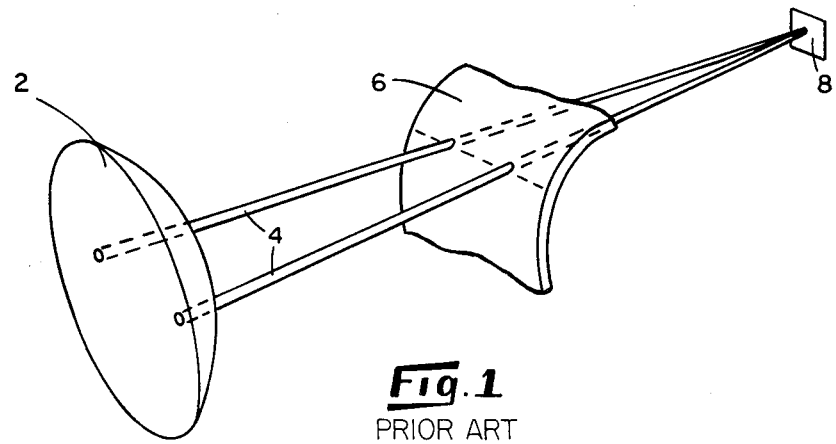
FIG. 1 is a perspective view showing the refraction of a pair of laser beams in the wall of a glass pipe as occurs in a Laser Doppler anemometry device.

Referring to FIG. 1, a Laser Doppler anemometry device of known structure generally includes a final focusing lens 2 for focusing a pair of coherent light (laser) beams 4 emerging from the anemometry device and traveling in beam paths through the fluid flow conduit or pipe 6 and intersecting within the pipe 6 at an intersection volume 8 within the fluid flow. It will be appreciated that a Laser Doppler anemometry device also, as known in the art, contains various other components which are not shown such as a laser for producing the coherent light beams, a beam splitter, a collecting lens, a photo multiplier, a signal processor and other standard components. As discussed above, calculating the Reynolds shear stress requires that the Doppler anemometry device utilize a two-color, four-beam system and cross-correlate the two obtained velocity components. In a cylindrical pipe system, the two pairs of beams, a vertical beam pair and a horizontal beam pair, traveling in separate beam paths and intersecting within the fluid will create two separate intersection volumes, spaced from each other, as shown schematically in FIG. 2. Since proper calculation of the Reynolds shear stress requires that the two intersection volumes be coincident, it is therefore necessary that one of the intersection volumes be moved so as to coincide with the other intersection volume, as shown in the bottom portion of FIG. 2.

Figure 3:
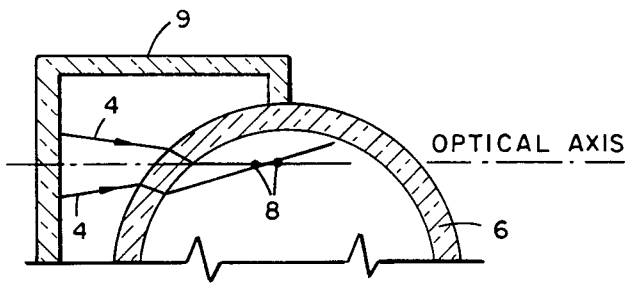
FIG. 3 is a cross-sectional view showing the effect on a pair of light beams obtained by surrounding a cylindrical pipe with a rectangular fluid filled box in a Laser Doppler anemometry device.

The difficulties in obtaining spacial coincidence of the intersection volumes in cylindrical pipes are basically due to the severe optical distortion effects caused at the cylindrical surfaces. It has been found that these distortion effects can be greatly reduced by attaching a rectangularly shaped fluid-filled box 9 to the exterior of the pipe in the area of the pipe at which the laser beams pass through the pipe wall. FIG. 3 illustrates this effect on a pair of beams. The fluid filled box preferably contains a fluid which has a refractive index equal to that of the fluid flowing within the pipe or conduit 6. Although this use of a fluid-filled box attached to the exterior of the pipe can greatly reduce the distortion effects, good spacial coincidence of the intersection volumes of the pairs of light beams is still not obtained, so that, further adjustments are necessary to achieve the desired spacial coincidence.

The position of the final focusing lens in an LDA system is conveniently referenced by two parameters, 1) $y_l$, the lens height, and 2) $d_l$, the lens-to-pipe distance. In a boxed-pipe LDA system, the locus of the image points, at fixed $y_l$, for both vertical and horizontal beam-paris, is a straight line. This "image line" is defined by an imaginary pathway that would be followed by a beam passing through the final focusing lens along its optical axis (the dashed line of FIG. 3). The parameter then that determines the separation of the two intersection volumes, at a fixed position of the final focusing lens (fixed $y_l$ and fixed $d_l$), is $d_l$, the lens-to-pipe distance.

Figure 2:
FIG. 2 is a scale drawing depicting the theory behind attaining coincident intersection volumes of two pairs of laser beams in a Laser Doppler anemometry device.
Figure 2:
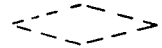
Figure 2:
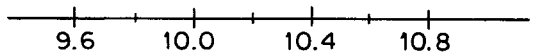
Figure 4:
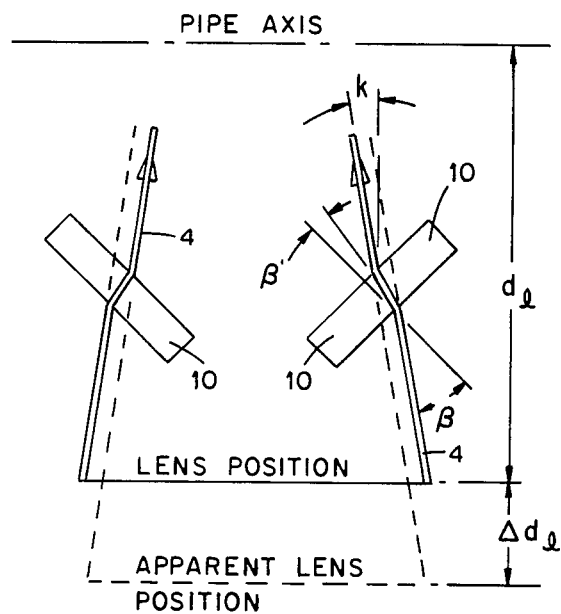
FIG. 4 is a schematic drawing showing the effect of inserting glass plates in the pathways of emerging laser beams for translating the light beam paths.

The present inventors have found that the desired spacial coincidence can be achieved if the effective distance between the final focusing lens 2 and the pipe 6 can be varied for one of the pairs of color beams while the corresponding distance for the other pair of beams is held fixed. The theory behind this method is best shown in FIG. 4 wherein a matched pair of transparent optical glass plates 10 are placed in the light beam paths between the final focusing lens and the fluid conduit. Positioning the glass plates 10 in this manner results in translating the light beam path in a direction parallel to the original beam path. Furthermore, if the two glass plates are positioned so as to be rotatable through the same angle but in opposite directions, that is with one glass plate rotating in a clockwise direction and the other plate rotating in a counter-clockwise direction, the two beam paths can be translated toward each other so that there is a resultant shift in the separation distance between the two light beams. This translation or shift in the distance between the light beam paths then results in a corresponding shift in the separation distance between the two intersection volumes of the vertical and horizontal beam paths, as shown in FIG. 2.

Thus, the glass plates 10 placed within the light beam paths should be selectively rotatable so as to provide for selective shifting of the separation distance between the light beam paths and, correspondingly, the separation distance between the intersection volumes. The angle of rotation needed for producing spacial overlap is given by the formula:

$$\frac{\sin(\beta - \beta')}{\cos\beta'} = \frac{\Delta d_l \sin k}{th}$$

wherein $\beta'$ is the refracted angle in the glass plates, k is one-half the angle between the beams, th is the plate thickness and $\Delta d_l$ is the effective lens-to-pipe distance change (see FIG. 4). For example, good overlap conditions can be obtained throughout the cross-sectional area of a water-filled 7.9 cm plastic pipe, wall thickness 0.63 cm, with an attached box, using a final focusing lens of 250 mm focal length and glass plates of 3.2 mm thickness, by varying the rotation angle $\beta$ over a 10° range. The present inventors have found that the desired spacial coincidence by means of a shift in the path of the laser light beam can be achieved by a device called a dual-beam translator (DBT) utilizing the above-discussed principle of positioning a glass plate or similar optical means in the laser beam path between the final focusing lens and the fluid flow conduit in a Laser Doppler anemometry device. Three possible embodiments for such a dual beam translator will now be described.

Figure 5:
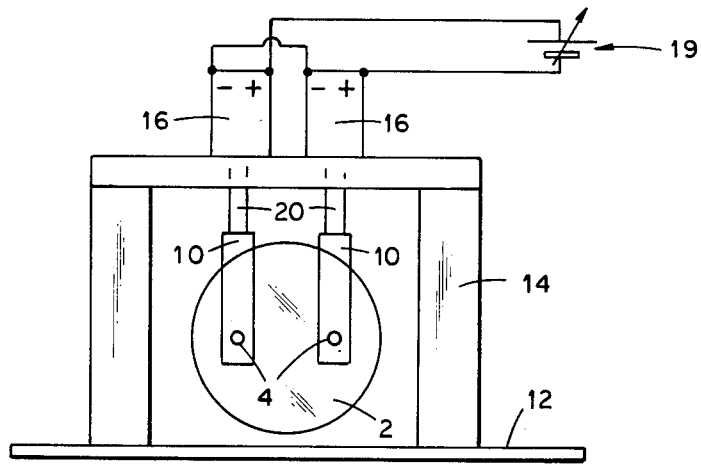
FIG. 5 is a front elevational view of one embodiment of a dual beam translator according to the present invention.

With reference to FIG. 5, the first embodiment of the DBT is generally comprised of an optical table 12, a support structure 14 and a pair of optical scanners 16 (General Scanning Co., Watertown, Mass., model G330) with associated glass plates 10 extending therebelow. The scanners 16 are attached to the top of the rigid table-like support structure 14 just overhead and in front of the final focusing lens of a Laser Doppler anemometry apparatus. The scanners 16 are of a type which can rotate 1°/100 mA in response to a variable voltage produced by a remotely placed variable DC supply 18. The scanners 16 include a downwardly extending and rotatable shaft 20 whereby variation in the DC current supplied to the scanners results in rotation of the shafts 20 in mutually opposite rotational directions. Each of the rotatable shafts 20 has a glass plate 10 attached thereto positioned in the path of a pair of laser beams having passed through the final focusing lens 2. Preferably, the glass plates are 3.2 mm x/10 mm×75 mm in dimensions.

In use, the dual-beam translator of FIG. 5 is utilized in conjunction with a standard Laser Doppler anemometry device such that the glass plates 10 are positioned in the laser beam paths 4 of either the vertical or horizontal beam pair. Accurate calculation of the Reynolds shear stress is obtained by determining the necessary angular rotation $\beta$ of the glass plates 10 needed to obtain coincidence of the intersection volumes of the vertical and horizontal beams. This necessary angular rotation is calculated according to the formula given above, and after determining the necessary value of $\beta$, the corresponding DC supply necessary to effect that angle of rotation is supplied to the optical scanners to effect rotation of the rotatable shafts 20 and the resultant angle of rotation $\beta$ for the glass plates 10.

Figure 6:
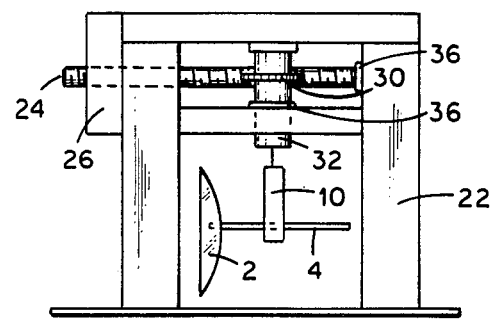
FIG. 6 is a side elevational view of a second embodiment of a dual beam translator according to the present invention.
Figure 7:
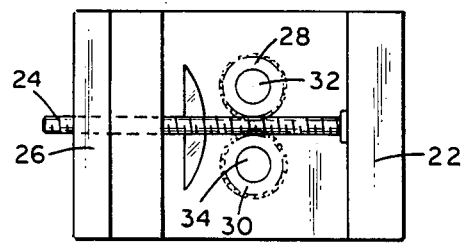
FIG. 7 is a top plan view of the embodiment of FIG. 6.

In a second embodiment of the present invention, a dual-beam translator device as shown in FIGS. 6 and 7 includes an optical table 12 and a support structure 22 with an associated mechanism for selectively rotating the glass plates 10. Passing through the support structure is worm screw 24 passing essentially along the same direction as the laser beams. The worm screw 24 has an associated precision rotator 26 (Oriel Co., Stamford, Conn., model 18087 or model 18088) which has a capability of being selectively and precisely operated within 1.5 arcsec accuracy (better than 0.01 accuracy) to effect rotation of the worm screw 24. Coupled to the worm screw 24 are a pair of gears 28, 30 which are preferably anti-backlash gears and rotated by rotation of the worm screw 24. Attached to the pair of gears 28, 30 is a corresponding pair of shafts 32, 34 to which then are rigidly attached the glass plates 10 extending downwardly into the path of the laser beams. The apparatus may also include bearing blocks 36 for properly securing the adjusting mechanism to the support structure.

In use, as similarly discussed above, the desired angular rotation $\beta$ for the glass plates 10 necessary to effect the desired coincidence of the intersection volumes of the two pairs of laser beams is calculated. The thus calculated angle of rotation $\beta$ is then effected by selectively and precisely operating the precision rotator 26 to effect rotation of the worm screw 24 whereby the gears 28 and 30 are caused to rotate in opposite rotational directions thereby effecting rotation of the shafts 32, 34 and the attached glass plates 10 about the desired angle of rotation $\beta$.

Figure 8:
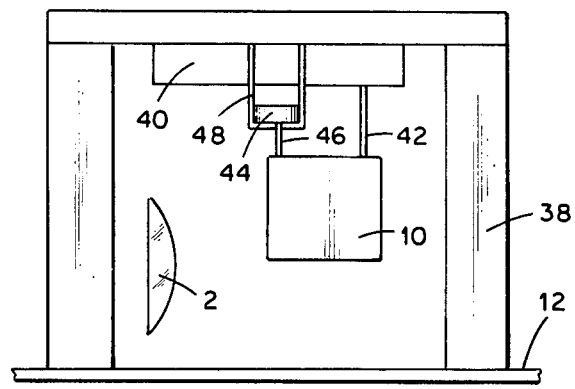
FIG. 8 is a side elevational view of a third embodiment of a dual beam translator according to the present invention.
Figure 9:
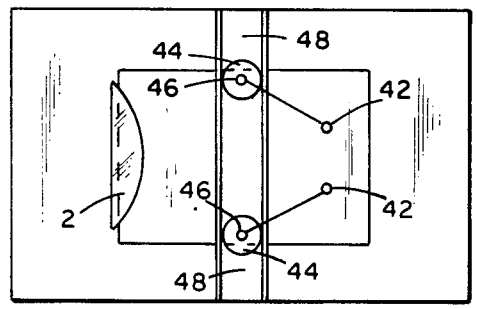
FIG. 9 is a bottom plan view of the embodiment of FIG. 8.

A third embodiment of the DBT according to the present invention is shown in FIGS. 8 and 9, again including an optical table 12 and a support structure 38. Attached to the support structure and extending therebelow is a precision translator 40 (Oriel Co., Stamford, Conn., model 18080 or model 18081-2) which is the mechanism utilized to effect the selective rotational movement of the glass plates 10. The glass plates 10 are attached and positioned below the precision translator by means of a hinged pin 42 on one side of the glass plate. The other side of the glass plate is associated with a roller 44 by means of a hinged pin 46. The roller 44 is positioned within a track 48 which is attached to the precision translator 40 and extends in a direction substantially perpendicular to the direction of movement of the translator and generally perpendicular to the path of the lens beams 4. The rollers 44 are movable within the track 48 whereby linear movement of the precision translator in a direction substantially parallel to the light beam paths results in rotational movement of the glass plates 10 about a desired rotational angle $\beta$ determined by the amount of linear motion of the translator 40.

In use, the desired rotational angle $\beta$ necessary to obtain spacial coincidence is calculated as described above and the amount of linear motion of the translator 40 necessary to effect this angular rotation is determined. The precision translator utilized in this embodiment of this invention has an accuracy of 1 $\mu$m over the entire traversed distance (about 0.01°). Selective operation of the translator resulting in linear movement of the translator causes the rollers 44 to move within the track 48 in opposite linear directions resulting in the glass plates 10 rotating in directions opposite from each other.

Measurements of Reynolds Shear Stress Using the Dual-Beam Translator

As discussed above, a Reynolds shear stress is proportional to the velocity correlation, $<\Delta u \Delta v>$, which is defined as $<\Delta u \Delta v> = <uv> - <u><v>$, where $<...>$ means the time or ensemble average and u and v are mutually perpendicular velocity components. For example, u may represent the downstream velocity component and v may represent the vertical cross-stream velocity.

The operation of the dual-beam translator of the present invention was tested for water flow in a 7.6 cm diameter glass pipe. Measurements were taken both upstream and downstream from a 2.54 cm diameter orifice with the pipe wall thickness being almost 0.5 cm. The purpose of the test was to determine whether spacial coincidence could be attained at positions where calculations predict a good spacial overlap of the intersection (probe) volumes, thereby permitting the direct measurement of velocity cross correlations (Reynolds shear stress) in a cylindrical test pipe section.

The tests were performed using a commercially available two-color, two-channel Laser Doppler anemometry (LDA) system with minor modifications (TSI, Inc., St. Paul, Minn.). The flow was seeded with approximately 5 m latex particles and the optics were arranged to collect back scattered light. Counter-type data processors were used in a coincidence mode of operation. The processors and the position encoders on the three-axis optical traversing machine were interfaced to an on-line digital computer. On-line ray-tracing calculations could also be performed to determine appropriate traverse settings. Data recorded for each valid coincident event consisted of the total time for the seed particles to cross each color probe volume and the number of fringes crossed for each channel. Acoustooptical Bragg cells were used for both optical channels. The particle velocities were computed from these data using averages appropriately weighted so as to eliminate concerns about velocity bias effects.

Measurements were performed by scanning along chords in the circular cross-section from the vertical mid-plane of the pipe towards the inner surface closest to the focusing lens, at various fixed heights. Specifically, cross stream scans were made along horizontal chords at elevations of 0, 1, 1.5, 2 and 3 cm above the median plane of the 7.6 cm diameter pipe. Measurements of the $<\Delta u \Delta v>$ values were performed at each one of these elevations based on an ensemble of ten runs, each consisting of 1,024 coincident velocity measurements.

The results of these tests for the various elevations are presented in Table 1 below. The data in this table show that sufficient overlap or spacial coincidence of the probe volumes was attained at each one of the measurement points. Although the errors (SEM) for the measurements were larger than might be desired, this appears to be basically due to the small number of events included in the measurement runs. This cause for the error is evidenced by the one measurement run ($X_1 = -10$ mm, $d_l = 155.81$ mm) where the number of events was doubled and the error was appreciably reduced.

The data in Table 1 further show that the essential parameter responsible for the image volume separation is the tranverse pipe-to-lens distance. Therefore, by varying this distance, for one of the pairs of beams only, the effected image volume can be moved along the line of the image locus to achieve spacial overlap or coincidence with the other image volume.

According to the present invention, the effective lens to pipe distance variations is achieved by a pair of optical quality flat glass plates which are rotated through a pre-determined angle $\beta$ intercepting the horizontal set of beams as they emerge from the final focusing lens (see FIG. 4). When using the DBT of the present invention for the measurement of cross-correlations, the angle of rotation $\beta$ necessary for achieving the desired spacial coincidence can be computed in the following manner.

TABLE 2

Calculations for Spacial Concidence Utilizing a DBT

| $X_I$ (mm) | $Y_I$ (mm) | $\Delta d_l$ (mm) | $\Delta r_I$ (mm) | $\beta$ (deg) | i (ma) |
|---|---|---|---|---|---|
| 0.005 | 0 | 0.47 | 0.0038 | 4.59 | 161 |
| −19.996 | 10 | 0.37 | 0.0065 | 3.61 | 126 |
| −10.162 | 20 | 0.61 | 0.0092 | 5.97 | 209 |
| −2.665 | 35 | 2.6 | 0.0046 | 23.83 | 834 |

$X_I$, $Y_I$, $\Delta d_l$, $\Delta r_I$, $\beta$ and i are as defined above in the specification

TABLE I

Cross Correlation Measurements Using a DBT

| $Y_I$ (mm) | $X_I$ (mm) | $d_I$ (mm) | $<u>$ (m/sec) | $<v>$ (m/sec) | $<uv>$ (m²/sec²) | $<\Delta u \Delta v>$ (m²/sec²) |
|---|---|---|---|---|---|---|
| 0 | −20 | 163.34 | 1.0802 ± 0.0640 | 0.3491 ± 0.0156 | 0.3989 ± 0.0376 | 0.0218 ± 0.0158 |
| 0 | −15 | 159.57 | 1.649 ± 0.0162 | 0.3151 ± 0.0078 | 0.5511 ± 0.0131 | 0.03152 ± 0.0052 |
| 0 | −10 | 155.81 | 2.3753 ± 0.0247 | 0.4050 ± 0.0100 | 0.9700 ± 0.0158 | 0.008 ± 0.0066 |
| 0 | 0 | 148.33 | 3.5193 ± 0.0151 | 0.2895 ± 0.0048 | 1.0092 ± 0.0153 | −0.00973 ± 0.0036 |
| 10 | −30 | 170.94 | 0.4795 ± 0.0297 | 0.1355 ± 0.0103 | 0.0665 ± 0.0118 | 0.00154 ± 0.0054 |
| 10 | −20 | 163.34 | 1.0621 ± 0.0404 | 0.2468 ± 0.0174 | 0.3030 ± 0.0283 | 0.04096 ± 0.0176 |
| 10 | −10 | 155.81 | 1.9524 ± 0.0276 | 0.3327 ± 0.0105 | 0.7125 ± 0.0250 | 0.06299 ± 0.0068 |
| 10 | −10 | 155.81 | 1.598 ± 0.01* | 0.385 ± 0.004* | 0.6704 ± 0.009* | 0.0529 ± 0.0031* |
| 10 | 0 | 148.33 | 2.4978 ± 0.0122 | 0.3335 ± 0.0110 | 0.9243 ± 0.0266 | 0.0914 ± 0.005 |
| 15 | 0 | 148.26 | 1.4299 ± 0.0162 | 0.0808 ± 0.0085 | 0.2198 ± 0.0125 | 0.10424 ± 0.0032 |
| 20 | −20 | 163.34 | 0.6566 ± 0.0214 | 0.1786 ± 0.0156 | 0.166 ± 0.0170 | 0.04937 ± 0.0068 |
| 20 | −10 | 155.81 | 1.1444 ± 0.0223 | 0.2799 ± 0.0071 | 0.3973 ± 0.0166 | 0.07702 ± 0.0110 |
| 20 | 0 | 148.33 | 1.3712 ± 0.0198 | 0.3524 ± 0.0122 | 0.5751 ± 0.0186 | 0.09183 ± 0.0063 |
| 30 | −15 | 159.45 | −0.4324 ± 0.007 | 0.0951 ± 0.002 | −0.0295 ± 0.0015 | 0.01161 ± 0.0012 |
| 30 | 0 | 147.62 | 0.0959 ± 0.0082 | 0.286 ± 0.0037 | 0.0493 ± 0.0035 | 0.02186 ± 0.0017 |

$Y_I$ = lens height above the median plane in the pipe
$X_I$ = distance of the measurement volume from the pipe axis in direction parallel to the optical axis of the lens
$d_I$ = the actual distance of the lens from the pipe axis
$<v>$ = average vertical cross-stream velocity
$<uv>$ = uv-cross correlation
$<\Delta u \Delta v>$ = fluctuating uv-cross correlation
$<u>$ = the average downstream velocity
*This measurement is based on an ensemble of 20 observational sets containing 1024 particle velocity measurements each.

1. The measurement (image) point at which the cross-correlation is to be measured is first determined and identified as $(x_I, y_I)$.

2. The proper lens setting for imaging the vertical beams at $(x_I, y_I)$ is then determined and called $(d_l, y_I)$. This is the traverse setting for making the measurement.

3. The proper lens setting for imaging the horizontal beams at $(x_I, y_I)$ is determined and called $(d_l, y_I)$. With lens setting $(d_l, y_I)$ for the horizontal beams, the resulting image point is determined and called $(x_I, y_I)$.

4. Using the formula $\Delta d = d_l - d_l$, the rotation angle $\beta$ for the glass plates is then computed from the formula $\sin(\beta - \beta')/\cos \beta' = \Delta d \sin k/\text{th}$, where $\beta'$ is the angle of refraction of a beam in the DBT glass plate, k is one-half the beam angle in air, and th is the thickness of the glass plates (see FIG. 4).

5. The resulting separation of the measurement volumes is then computed by the formula:

$$\Delta r_I = \sqrt{(\tilde{x}_I - x_I)^2 + (\tilde{y}_I - y_I)^2}$$

6. For a commercially available optical scanner, the sensitivity of this scanner S is given in ma/deg and the DC power supply setting necessary for effecting the proper angle rotation is calculated as $i = S\beta$.

As an example, Table 2 shows some typical values of $\Delta d_l$, $\Delta r_1$, $\beta$ and i for measurements taken utilizing the DBT of the present invention according to the embodiment shown in FIG. 5 utilizing glass plates 3.2 mm thick having an index of refraction of n=1.518 and utilizing optical scanners having a sensitivity of S=35 ma/deg.

In actual use, the following steps are followed to properly align the glass plates in the DBT device for measurement in a cylindrical pipe test section.

a. With the glass plates removed from the DBT, the two color beams are aligned in air so that the two measurement volumes will overlap as much as possible. This step can be greatly facilitated if a magnified image of the two intersection volumes is projected onto a far wall using a microscope objective and any adjustment can then be easily followed by visual observation of the projected images.

b. A small (2 mm or less) aperture is placed in the pathway of each horizontal beam while the three other beams are intercepted. The apertures should be placed as far back on the beam pathway as possible so as to maximize the "lever arm". A glass plate is then mounted on the appropriate scanner shaft and manually rotated until the reflected beam from the plate passes back through the aperture opening.

c. To test whether the proper alignment has been achieved, the coincidence count rate in air is measured using a jet air stream with current to the scanners turned off. When the coincidence time gate is lowered, the resulting coincidence rate should not change appreciably if a good overlap condition has been achieved. Then, with current to the scanners turned on, the plates are slowly rotated and, as the angle of rotation increases, the coincidence counting rate should diminish to 0 while the individual counting rates should not significantly change.

d. Finally, the achieved overlap is tested by inserting the beams into a cylindrical test section in the presence of a flow field, with the DBT plates rotated through appropriate angular displacements. If good overlap conditions exist, the coincidence count rates will be significantly higher than the computed accidental coincidence count rate. The latter accidental rate, $N_A$, is defined as $N_A = 2 (\Delta\tau) N_1 N_2$, where $\Delta\tau$ is the time gate value, and $N_1$ and $N_2$ are the individual count rates for channels 1 and 2 respectively.

The above discussed test results demonstrate that the dual-beam translator of the present invention provides a useful device for the measurement of Reynolds shear stress in pipe geometry with a Laser Doppler anemometry device. The DBT device permits spacial coincidence or overlap of a two-color beam laser device so as to provide good correlation between the mutually perpendicular velocity components. The measurements obtainable by the use of the present invention are useful in various applications in fluid mechanics including the verification and development of computational turbulence models for various cylindrical pipe geometries and for an understanding of fluid or fluid-structure behavior.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What we claim:

1. A method for attaining substantial spacial coincidence of the intersection volumes of two pairs of intersecting light beams in a fluid flow conduit in a Doppler anemometry device comprising focusing said two pairs of light beams with a beam focusing means and selectively translating the beam paths of at least one of said pairs of beams, said paths being translated in a direction parallel to the original beam paths by a pair of rotatable transparent optical means provided in said beam paths between said beam focusing means and said fluid flow conduit.

2. A method as in claim 1, wherein said light beams are coherent light beams.

3. A method as in claim 1, wherein said transparent optical means are rotatable about an axis substantially perpendicular to said beam paths.

4. A method as in claim 3, wherein said transparent optical means are glass plates.

5. A method as in claim 3, wherein said pair of transparent optical means are rotatable in opposite directions.

6. A method as in claim 2, wherein said coherent light beams are produced by a laser means.

7. A dual-beam translator for use in a laser doppler anemometry device comprising:
    support means for supporting said translator between a focusing means of an anemometry device and a fluid flow conduit;
    two pairs of intersecting light beams, each of said pair of beams intersecting at an intersection volume within said fluid flow conduit;
    at least one pair of transparent optical means being positioned in the paths of at least one pair of said light beams, for selectively translating the paths of that pair of light beams in a direction parallel to the direction of said paths; and
    rotation means being operatively associated with said transparent optical means for selectively rotating said pair of optical means in opposite directions about an axis substantially perpendicular to said paths, whereby substantial spacial coincidence of said intersection volumes is obtained.

8. A dual-beam translator as in claim 7, wherein said rotation means comprises a pair of optical scanners associated with a variable electrical supply, each of said optical scanners including a rotatable shaft being operatively associated with a corresponding transparent optical means, whereby variations in the output of said electrical supply effects selective corresponding opposite rotation of said pair of optical means.

9. A dual-beam translator as in claim 8, wherein said optical scanners include read-out means for determining the rotational displacement thereof.

10. A dual-beam translator as in claim 8, wherein said optical means are glass plates.

11. A dual-beam translator device as in claim 8, wherein said light beams are coherent light beams.

12. A dual-beam translator device as in claim 11, including a laser means for producing said coherent light beams.

13. A dual-beam translator device as in claim 8, wherein said fluid flow conduit further includes a fluid-filled box surrounding said conduit in the area of said intersection volumes, said fluid-filled box containing a fluid with a refractive index equal to that for the fluid flowing in said conduit.

14. A dual-beam translator as in claim 7, wherein said rotation means comprises:
    a rotatable worm screw means;
    a rotator means operatively associated with said screw means for rotating said screw means;
    a pair of rotatable shaft means, associated with a corresponding pair of said optical means, and positioned on opposite sides of said screw means; and
    said pair of rotatable shaft means being operatively associated with a corresponding pair of gear means, said pair of gear means being operatively associated with said screw means, whereby activating said rotator causes selective rotation of said worm screw thereby causing rotation of said gear means and said shaft means to thereby rotate said pair of optical means in directions opposite from each other.

15. A dual-beam translator as in claim 14, wherein said gear means are anti-backlash gears.

16. A dual-beam translator device as in claim 14, wherein said optical means are glass plates.

17. A dual-beam translator device as in claim 14, wherein said light beams are coherent light beams.

18. A dual-beam translator device as in claim 17, including a laser means for producing said coherent light beams.

19. A dual-beam translator device as in claim 14, wherein said fluid flow conduit further includes a fluid-filled box surrounding said conduit in the area of said intersection volumes, said fluid-filled box containing a fluid with a refractive index equal to that for the fluid flowing in said conduit.

20. A dual-beam translator device as in claim 7, wherein said rotation means comprises:
    a translator positioned on said support means and being linearly movable along a path extending between said focusing means and said fluid flow conduit;
    a track means associated with said translator and extending in a direction substantially perpendicular to said linear path;

a pair of roller means movable within said track means; and said optical means having first and second sides, said first sides of said pair of optical means being pivotally associated with said translator, said second sides of said optical means being pivotally associated with corresponding ones of said roller means, whereby linear movement of said translator effects movement of said roller means within said track means to thereby rotate said pair of optical means in opposite directions.

21. A dual-beam translator device as in claim 20, wherein said optical means are glass plates.

22. A dual-beam translator device as in claim 20, wherein said light beams are coherent light beams.

23. A dual-beam translator device as in claim 22, including a laser means for producing said coherent light beams.

24. A dual-beam translator device as in claim 20, wherein said fluid flow conduit further includes a fluid-filled box surrounding said conduit in the area of said intersection volumes, said fluid-filled box containing a fluid with a refractive index equal to that for the fluid flowing in said conduit.

25. A method for measuring Reynolds stress in a fluid flow conduit comprising correlating the velocity measurements obtained from two pairs of intersecting light beams having intersection volumes within said conduit, said intersection volumes being substantially spacially coincident, the spacial coincidence of said intersection volumes being obtained by focusing said two pairs of light beams with a beam focusing means and selectively translating the beam paths of at least one of said pairs of beams, said paths being translated in a direction parallel to the original beam paths by a pair of rotatable transparent optical means provided in said beam paths between said beam focusing means and said fluid flow conduit.

26. A method as in claim 25, wherein said light beams are coherent light beams.

27. A method as in claim 25, wherein said transparent optical means are rotatable about an axis substantially perpendicular to said beam paths.

28. A method as in claim 27, wherein said transparent optical means are glass plates.

29. A method as in claim 27, wherein said pair of transparent optical means are rotatable in opposite directions.

30. A method as in claim 26, wherein said coherent light beams are produced by a laser means.

* * * * *